April 13, 1926.  E. ROUČKA  1,580,677

MEASURING DEVICE OPERATING BY MEANS OF A CONTINUOUS LIQUID FLOW

Filed August 16, 1921   3 Sheets-Sheet 1

INVENTOR

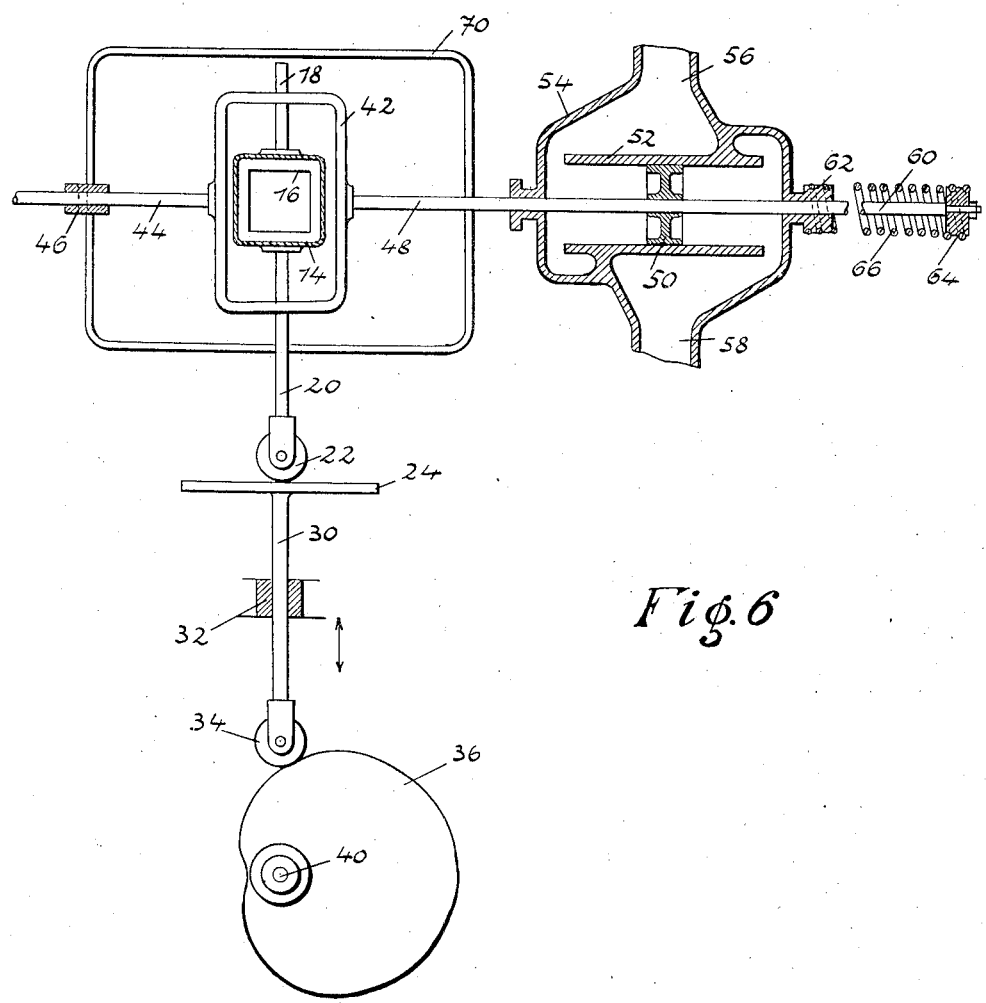

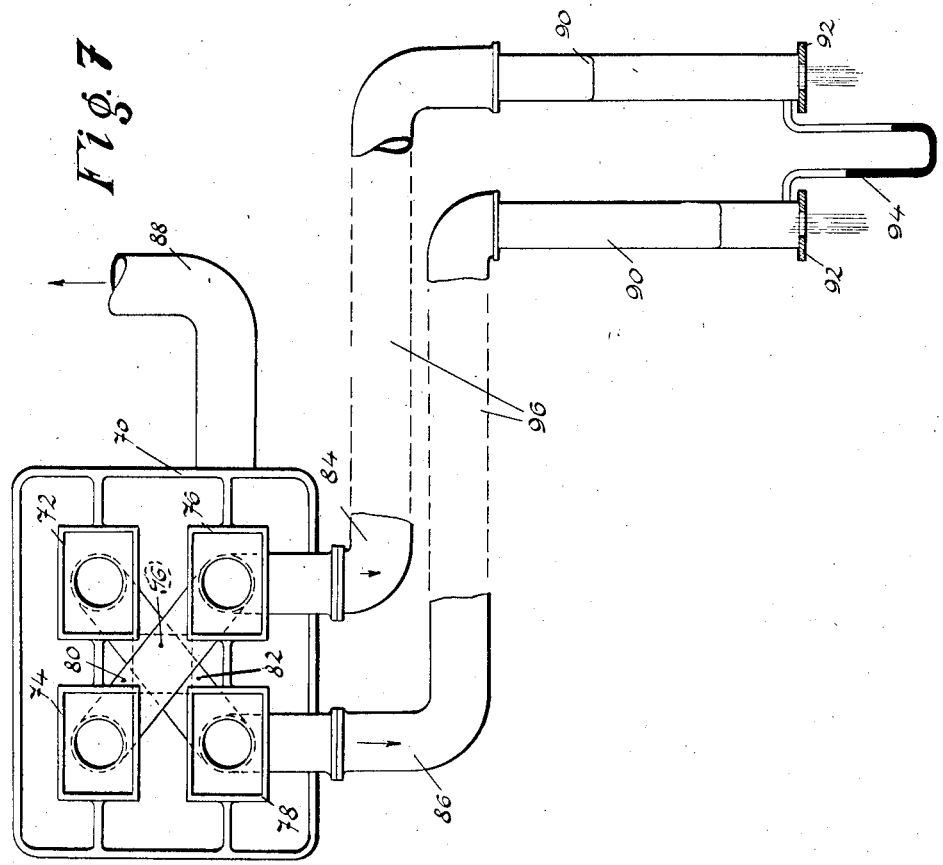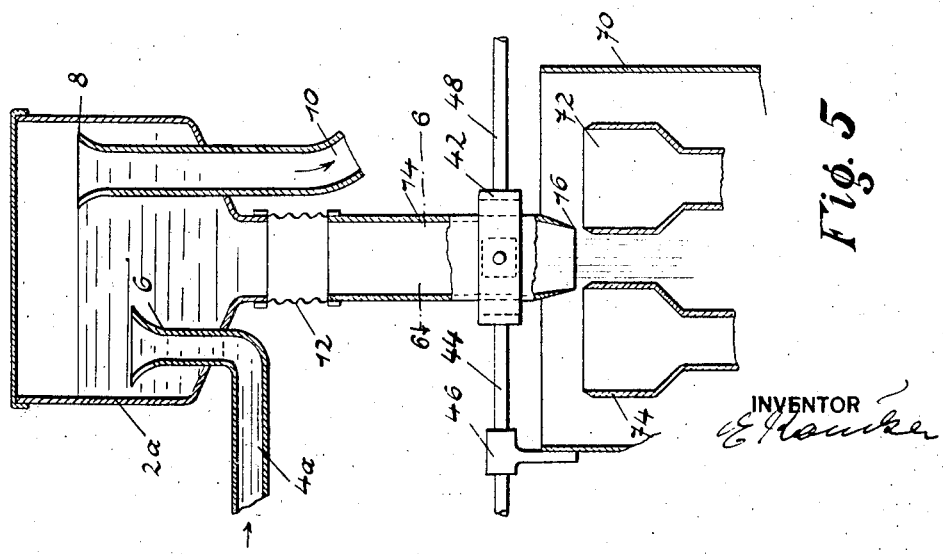

Patented Apr. 13, 1926.

1,580,677

UNITED STATES PATENT OFFICE.

ERICH ROUČKA, OF BLANSKO, CZECHOSLOVAKIA.

MEASURING DEVICE OPERATING BY MEANS OF A CONTINUOUS LIQUID FLOW.

Application filed August 16, 1921. Serial No. 492,861.

*To all whom it may concern:*

Be it known that ERICH ROUČKA, a citizen of Czechoslovakia, residing at Blansko, Czechoslovakia, has invented certain new and useful Improvements in Measuring Devices Operating by Means of a Continuous Liquid Flow, of which the following is a specification.

Apparatus are known, in which by separating quantities of fluids from a continuously flowing stream readings can be obtained in this way, viz, that the variations in the operations, values or conditions to be measured correspondingly affect the quantities of the fluid separated at the time and these act on suitable indicating devices.

My invention consists in an apparatus which enables reckoning operations to be carried out, or values or conditions to be measured through the separation of measured quantities of fluid from a continuously flowing stream by causing the separation of the measuring fluids to be effected by the combination of two or more different (single) movements, each of which corresponds to the variations of a numercal value, or of a condition. Hereby it is possible, according to the positive or negative direction of the single movements and the movements resulting therefrom, to vary the cross-sectional area so that the quantity of fluid separated per unit of time shows products and quadrates, or differences of products of the given values, so that by ascertaining the quantity of fluid thus to be separated and the one value determining this, the others can be found and thereby quotients and roots, etc., be ascertained. With this apparatus, in particular, physical or chemical values can be recorded, which consist of factors varying with the time.

The arrangement according to the invention consists essentially in the provision of devices which subject the separating body simultaneously to a number of different effects of movement, under the resultant influence of which it effects a composite movement and is adjusted to a definite cross-sectional value of the separation fluid.

According to the purpose for which the apparatus is employed the separating parts may have an oscillating, pendulous or rotary movement or may be stationary and the streams of measuring fluid of a suitable form may perform a corresponding movement. By repetition of a simple arrangement, or its combination with known combination apparatus (differential gear, logarithmetic, multiplication gear, etc.), it is possible also to obtain easily complicated combinations of a number of physical values, or effects. If in the measuring liquid that is flowing away, an apparatus that acts on the speed of flow of the liquid, or measuring instruments or the like affecting the kinetic energy of the flowing liquid, be arranged, a direct indication of the indicated delivery is obtained. The separating devices could also act so that the rest of the measuring stream would serve as result in connection wherewith a number of liquid quantities could be united or additional quantities be caused to flow.

Referring to the accompanying drawings, in which like numerals of reference indicate the same parts throughout the several views, Figure 1 is a diagrammatic illustration showing the normal relative positions of the measuring stream and the separating device;

Figure 4:
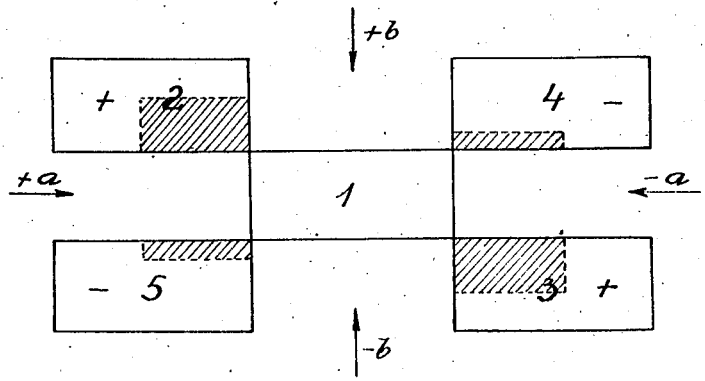

Figure 4 diagrammatically illustrates an apparatus for measuring the energy of a double cylinder engine, four separating devices being shown, two for negative actions, and two for positive actions of the engine;

Figure 5 is a diagrammatic transverse sectional view through one form of measuring apparatus embodying the invention;

Figure 6 is a horizontal sectional view taken on the line 6—6 of Fig. 5, and showing the actuating mechanism for the measuring apparatus, portions of the separating device being omitted for clearness in illustration, and Figure 7 is a top plan view of the separating device.

The arrangement is based on the following considerations.

Figure 1:
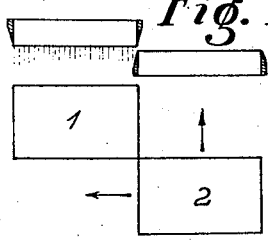

If 1 in Fig. 1 indicates a stream of measuring fluid (water, oil or the like) in cross-section, 2 the separating body, these can execute two relative movements $a$ and $b$, which are either perpendicular to one another or may be at any preferred angle not parallel to the stream. Now, if an action be expressed through the movement $a$ and another through the movement $b$, from the stream of fluid, according to Fig. 2 for example, the cross-hatched part cross-section of the stream becomes separated, which is proportionate to the product $a \times b$. Thus the separated quantity of fluid is proportional to the product of the two effects, multiplied by the duration of the action.

The absolute value of the product $a \times b$ can therefore be ascertained at once by being read off if known measuring apparatus be employed.

If the two effects, consequently also the two movements $a$ and $b$ are equally great, the product to be read off is a quadrate.

Figure 2:
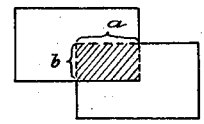
Figure 2 is a similar view showing the relative positions of the stream and separating device when the stream is being separated.

Now, if in the case represented in Figs. 1 and 2, a movement $c$ acts in opposition to the movement $a$, so that this is partially nullified, the fluid cross-section is proportional to the product $a \times b$, less the product $c \times b$, so that a difference of products of the given values results.

A formation of quotients is possible in this way viz: that a value, for example the movement $b$ is fixed and the other value $a$ so determined that the cross-sectional area of the separated fluid stream attains a previously determined value F. As now $F = a \times b$, the value $a$ to be deduced is equal to the quotient $\frac{F}{b}$ In a precisely corresponding manner roots can be formed, as two entirely similar values or effects $a$, which represent two movements running perpendicularly to one another, are so adjusted that the cross-sectional area of the separated stream of fluid attains the previously determined value. Thus $F = a^2$, or the value $a$ to be obtained is: $a = \sqrt{F}$.

With the application of the above principles it is possible to obtain precise and accurately indicating period indications, in connection wherewith the one movement is made proportional to the piston velocity at the time, the other to the over-pressure. The quantity of fluid separated at any time would consequently be exactly proportional to the delivery indicated at the moment and the total quantity of water separated to the indicated delivery in a determined period of time.

Such an indication would at the same time come into consideration in connection with the compression action of a power engine, and the arrangement could be so that the separation of the stream of fluid is effected by a number of separating parts, one part being influenced by over-pressure at the time, the other by the compression pressure, in connection wherewith the different separated quantities of fluid could be suitably subtracted from one another as positive and negative values.

Figure 3:
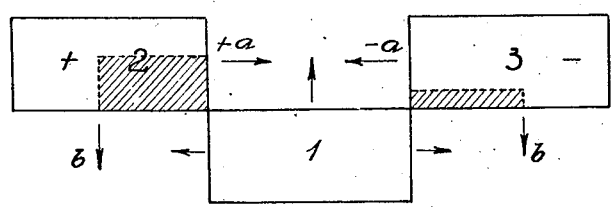
Figure 3 is a diagrammatic illustration showing two separating devices each influenced by a different physical quantity or value.

Fig. 3 digrammatically illustrates such an arrangement.

1 indicates the stream of fluid in cross-section, 2 and 3 the separating bodies, which for example are suitably connected with one another. Stroke $+a$ would be proportional to the piston velocity at the movement in the one direction, $-a$ in the other direction. Stroke $b$ would be proportional to the effective resulting pressure of the piston at the time. With the working stroke (positive piston velocity) the part 2 would separate the fluid with the evacuating or compression stroke part 3. In explosion motors and the like, in which there is not a power stroke at every revolution, the separation parts would have to be driven by special gears, and the number of separating parts be increased; the same in steam engines, if it were desired to measure on both sides of the cylinder, or in the case of multiple cylinder engines.

In suitable cases also a number of streams of fluid could be employed and the separating parts could also separate fluid from a number of streams of fluid.

Fig. 4 would represent an arrangement with four separating parts as an indicator of a double cylinder.

1 indicates the stream of measuring fluid, 2 and 3 the separating parts for positive work, 4 and 5 for negative. $+a$ would be the piston velocity in the one direction, $-a$ in the other, $+b$ the resulting piston pressure in the one direction, $-b$ in the opposite direction. If the function be considered with a double diagram, it will be seen that the different positive working actions or deliveries control measuring fluid in 2 and 3, the negative actions (compression or evacuation) in 4 and 5. By suitably subtracting the two deliveries from one another the useful or effective delivery can be ascertained.

Beyond the indicators in piston engines and piston-working machines (pumps, blowers, etc.,) this arrangement can be employed for other purposes where a mathematical compound (products, quotients, quadrates, etc.) of two or more physical values or effects of any kind is to be read off or counted for instance in mechanical efficiency meters, gas, fluid, steam meters, degree of efficiency meters, etc.

In Figures 5-7 inclusive, I have shown an apparatus for measuring the energy produced or consumed by a reciprocating engine including a cylinder and piston. This apparatus includes a reservoir $2^a$ for the measuring liquid to which the liquid is supplied by a pipe $4^a$ and a nozzle 6. The level of the liquid in said reservoir is controlled by an overflow nozzle and pipe 8 and 10. The outlet of the reservoir is connected by a flexible tubular connection 12 to one end of a conduit 14, the other end of which is formed into a nozzle 16, the said nozzle forming the measuring liquid into a jet, the separation of quantities from which serves as a measure.

The separating device includes a casing 70 having arranged therein a plurality of receptacles 72, 74, 76 and 78, the diagonally opposite ones of which are connected by the respective pipes 80 and 82. These receptacles are arranged beneath the nozzle 16, and the nozzle is adapted to be moved in a plurality of directions over said receptacles whereby quantities of the jet of liquid from said nozzle are collected by said receptacles.

In the present instance an elongated rectangular frame 42 surrounds the conduit 14, said frame being slidably mounted to move in opposite directions on rods 44 and 48 in a bearing 46 mounted on the casing 70. The said frame 42 is adapted to be actuated by the difference in pressure on the two sides of the piston of the engine the energy of which is being measured, and for this purpose I may provide a casing 54 connected to the engine cylinder at opposite sides of the piston by means of the conduits 56 and 58. The casing 54 is formed with an integral cylinder 52 interposed between the said conduits 56 and 58 and a piston 50 is mounted on the rod 48 and is slidably mounted in said cylinder so as to be acted upon at its opposite sides by the pressures in the respective conduits 56 and 58. The difference in pressure in the said conduits acts upon a compression spring 66 interposed between the casing 54 and a collar 64 on the rod 48. It will thus be seen that the frame 42 will be reciprocated in opposite directions by the differences in pressure at opposite sides of the piston of the engine and the spring 66, and as the frame is moved it carries with it the conduit 14 which swings on the flexible connection 12.

Rods 18 and 20 are connected to opposite sides of the conduit 16 and are slidably mounted in the frame 42 to move in opposite directions transversely of the movement of the frame 42, the rod 20 being provided with a roller 22 engaging a track 24 carried by one end of a rod 30 slidably mounted in a fixed support 32. The other end of said rod 30 carries a roller 34 engaging a cam 36 mounted to rotate on a shaft 40. The shaft 40 is so connected to the piston of the engine that the position of the cam 36 is proportional to or a function of the velocity of the piston and it will be observed that rotation of the said cam will cause alternately opposite movements of the rods 30 and 20 which in turn produces corresponding movements of the conduit 16.

In the operation of the apparatus the nozzle 16 is moved over the receptacles 72—76 in accordance with the momentary pressure difference at opposite sides of the piston and the speed of the piston. As the nozzle so moves certain quantities of the jet of liquid therefrom are deposited in the receptacles 72—76.

The receptacles 74, 76 and 72, 78 are connected by the respective pipes 84 and 86 to a differential device including the two pipes 90 which are provided with the respective orifices 92 from which the liquid flows. A differential manometer 94 is connected between the pipes 90, and this manometer indicates the difference in flow of the liquid from the orifices 92 of the two pipes 90 which is a measure for the energy of the engine. The liquid flowing in the pipe 84 is a function of the positive energy of the engine while the liquid flowing in the pipe 86 is a function of the negative energy, and the manometer 94 indicates the net energy produced or consumed by the engine. The portion of the jet of liquid from the nozzle 16 not collected by the receptacles 72—78 flows from the casing 70 through an outlet pipe 88.

It will be understood that the differential device 90, 90 and the manometer 94 are merely for the purpose of illustrating an indicating device, and that other devices may be utilized for recording or registering the energy produced or consumed by the engine.

The forms of the invention shown and described are merely for the purpose of illustrating the principles of the invention, and it will be understood that other forms of apparatus and other means for producing relative movement of the stream of liquid and the separating device may be utilized without departing from the spirit or scope of the invention. Therefore, I do not desire to be understood as limiting myself except as required by the following claims when construed in the light of the prior art.

I claim as my invention:

1. An apparatus for measuring a plurality of values by means of continuously flowing liquid, comprising means adapted to form a constant jet of a liquid flowing at constant speed, means for separating quantities of liquid from said jet, said first two mentioned means being capable of relative movement in a plurality of directions angular with respect to said jet, and means actuated by said plurality of values to produce relative movement of said first two mentioned means, whereby quantities of liquid are separated from said jet, said separated quantities of liquid being a compound of functions of said plurality of values.

2. An apparatus for measuring a plurality of values by continuous flowing liquid comprising a means adapted to form a constant jet of a liquid flowing at constant speed, a means for separating quantities of liquid from said jet, said first two mentioned means being adapted for relative movement in a plurality of directions angular with respect to said jet, and said plurality of devices to be actuated by a plurality of values to be measured and adapted to produce relative movement of said first-mentioned and second-mentioned means in accordance to the variations of said values, whereby quantities of liquid are separated from said jet, said separated quantities of liquid being a compound of functions of said plurality of values.

3. An apparatus for measuring the energy produced or consumed by a machine having a cylinder and reciprocating piston therein by means of continuously flowing liquid, comprising a means adapted to form a constant jet of a liquid flowing at constant speed, a means for separating quantities of liquid from said jet, said first two mentioned means being adapted for relative movement in a plurality of directions angular with respect to said jet, a device for producing relative movement of said first-mentioned and second-mentioned means in one direction in accordance with the pressure or pressure difference on said piston of said machine, and a second device for producing relative movement of said first two mentioned means in another direction in accordance with the speed of travel of the piston, whereby quantities of liquid are separated from said jet, said separated quantities of liquid being a compound of functions of said pressure and the speed of said piston.

4. An apparatus for measuring energy of reciprocating piston engines by means of continuously flowing liquid, comprising a means adapted to form a constant jet of a liquid flowing at constant speed, a means for separating quantities of liquid from said jet according to the positive and the negative energy produced or consumed by the engine, said first two mentioned means being adapted for relative movement in a plurality of directions angular with respect to said jet, a device for producing relative movement of the first-mentioned and second-mentioned means in one direction according to the pressure or pressure difference on the piston of the engine, a second device for producing relative movement of said first two mentioned means in another direction according to the speed of travel of the piston, whereby quantities of liquid are separated from said jet, the difference of said quantities of liquid separated in accordance with the positive and the negative energy being a measure of the energy produced or consumed by the engine, and means for indicating the difference between said separated quantities.

5. Apparatus for measuring a plurality of values by means of continuously flowing liquid, comprising means to form a constant jet of a liquid flowing at constant speed, means including a plurality of relatively fixed conduits for receiving separate quantities of liquid from said jet, said jet forming means being capable of movement in a plurality of directions relatively to said second-mentioned means so as to deposit separate quantities of liquid from said jet into said conduits, and means actuated by said plurality of values to move said jet forming means relatively to said second-mentioned means in said plurality of directions.

6. Apparatus for measuring a plurality of values by means of continuously flowing liquid, comprising means to form a constant jet of a liquid flowing at constant speed, means including a plurality of relatively fixed conduits for receiving separate quantities of liquid from said jet, said jet forming means being capable of movement in a plurality of directions relatively to said second-mention means so as to deposit separate quantities of liquid from said jet into said conduits, means actuated by one value to move said first-mentioned means in one of said plurality of directions, and means actuated by another value to move said first-mentioned means in another of said plurality of directions, whereby a resultant composite movement of said jet forming means is produced and separate quantities of liquid from said jet are deposited in said conduits.

In testimony whereof I have hereunto set my hand.

ERICH ROUČKA.